US012777316B2

(12) United States Patent
Jia et al.

(10) Patent No.: US 12,777,316 B2
(45) Date of Patent: Oct. 27, 2026

(54) AUTOMATICALLY ACTIVATING A DEDICATED NETWORK SLICE FOR EMERGENCIES

(71) Applicant: AT&T Intellectual Property I, L.P., Atlanta, GA (US)

(72) Inventors: Yupeng Jia, South Pasadena, CA (US); Rashmi Palamadai, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 223 days.

(21) Appl. No.: 18/821,866

(22) Filed: Aug. 30, 2024

(65) Prior Publication Data

US 2026/0067660 A1 Mar. 5, 2026

(51) Int. Cl.

*H04W 4/90* (2018.01)
*H04W 4/02* (2018.01)
*H04W 4/80* (2018.01)

(52) U.S. Cl.

CPC ............... *H04W 4/90* (2018.02); *H04W 4/02* (2013.01); *H04W 4/80* (2018.02)

(58) Field of Classification Search

CPC ........... H04W 4/90; H04W 4/02; H04W 4/80; H04W 16/14; H04W 28/16; H04W 16/10; H04W 72/04; H04W 12/08; H04W 76/50; H04W 64/00; H04W 4/029; H04W 84/18; H04W 16/06; H04W 72/51; H04W 4/38; H04W 12/63; H04W 12/61; H04W 4/024; H04W 84/042; H04W 24/02; H04W 72/00; H04W 28/0289; H04M 15/60; H04M 1/72415; H04M 2242/04; H04M 3/5116; H04M 1/72421; H04M 1/72418; G06N 20/00; G06N 3/006; G06N 3/02; G06N 3/042; G06N 3/08; G06N 3/045; G06N 3/091; H04L 63/0272; H04L 41/16; H04L 12/4641; H04L 69/14; H04L 2012/2841; H04L 2012/40215; H04L 2209/80; H04L 12/46

See application file for complete search history.

(56) References Cited

U.S. PATENT DOCUMENTS

| | | | | |
|---|---|---|---|---|
| 2018/0332441 | A1 * | 11/2018 | Shaw | H04L 41/0894 |
| 2019/0364510 | A1 * | 11/2019 | Bonazzoli | H04W 52/0277 |
| 2023/0062010 | A1 * | 3/2023 | Malboubi | H04W 24/08 |
| 2026/0058942 | A1 * | 2/2026 | Osbourne | H04L 63/083 |

* cited by examiner

*Primary Examiner* — Nimesh Patel

(74) *Attorney, Agent, or Firm* — Guntin & Gust, PLC; Andrew Gust

(57) ABSTRACT

In one example, a method includes receiving a message from a mobile device of a user that initiates a virtual handshake, wherein the user is not a first responder, sending, in response to a completion of the virtual handshake, a first instruction that causes the mobile device to modify a setting of the mobile device to facilitate access to a slice of a communications network that is dedicated for use by emergency services, detecting, via the slice, a current physical location of the mobile device; and reporting, via the slice, the current physical location of the mobile device to a provider of an emergency service.

20 Claims, 4 Drawing Sheets

300

400

AUTOMATICALLY ACTIVATING A DEDICATED NETWORK SLICE FOR EMERGENCIES

The present disclosure relates generally to mobile communications networks, and relates more particularly to devices, non-transitory computer-readable media, and methods for automatically activating a dedicated network slice for emergencies in response to detecting an action on a mobile device that indicates an emergency situation.

BACKGROUND

Mobile devices (e.g., smart phones, tablet computers, wearable devices, connected vehicles, and the like) are often used to engage with network connected applications, such as streaming music and video applications, gaming applications, and others. Different applications have different requirements for uplink and downlink latency, throughput, and packet loss rates depending on quality of experience (QoE) targets and/or other performance requirements.

A "network slice" is a set of network resources that collectively provides an end-to-end network that is tailored to fulfill specific performance requirements. For instance, a plurality of network slices may be configured, where each network slice may provide different performance with respect to one or more key performance indicators (or "KPIs," e.g., throughput, latency, packet loss, etc.). Network slices may also be configured to address the needs of specific applications or types of applications (e.g., providing high upload speeds for streaming high bitrate video, providing encryption for the transmission of sensitive data such as data streams generated by health monitoring sensors, etc.). In 5th generation (5G) mobile networks, a "network slice" is understood to refer even more specifically to a protected channel for one or more devices to privately communicate with a radio access network (RAN).

SUMMARY

In one example, the present disclosure describes a device, computer-readable medium, and method for automatically activating a dedicated network slice for emergencies in response to detecting an action on a mobile device that indicates an emergency situation. For instance, in one example, a method performed by a processing system including at least one processor includes receiving a message from a mobile device of a user that initiates a virtual handshake, wherein the user is not a first responder, sending, in response to a completion of the virtual handshake, a first instruction that causes the mobile device to modify a setting of the mobile device to facilitate access to a slice of a communications network that is dedicated for use by emergency services, detecting, via the slice, a current physical location of the mobile device; and reporting, via the slice, the current physical location of the mobile device to a provider of an emergency service.

In another example, a non-transitory computer-readable medium stores instructions which, when executed by a processing system, including at least one processor, cause the processing system to perform operations. The operations include receiving a message from a mobile device of a user that initiates a virtual handshake, wherein the user is not a first responder, sending, in response to a completion of the virtual handshake, a first instruction that causes the mobile device to modify a setting of the mobile device to facilitate access to a slice of a communications network that is dedicated for use by emergency services, detecting, via the slice, a current physical location of the mobile device; and reporting, via the slice, the current physical location of the mobile device to a provider of an emergency service.

In another example, a device includes a processing system including at least one processor and a computer-readable medium storing instructions which, when executed by the processing system, cause the processing system to perform operations. The operations include receiving a message from a mobile device of a user that initiates a virtual handshake, wherein the user is not a first responder, sending, in response to a completion of the virtual handshake, a first instruction that causes the mobile device to modify a setting of the mobile device to facilitate access to a slice of a communications network that is dedicated for use by emergency services, detecting, via the slice, a current physical location of the mobile device; and reporting, via the slice, the current physical location of the mobile device to a provider of an emergency service.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
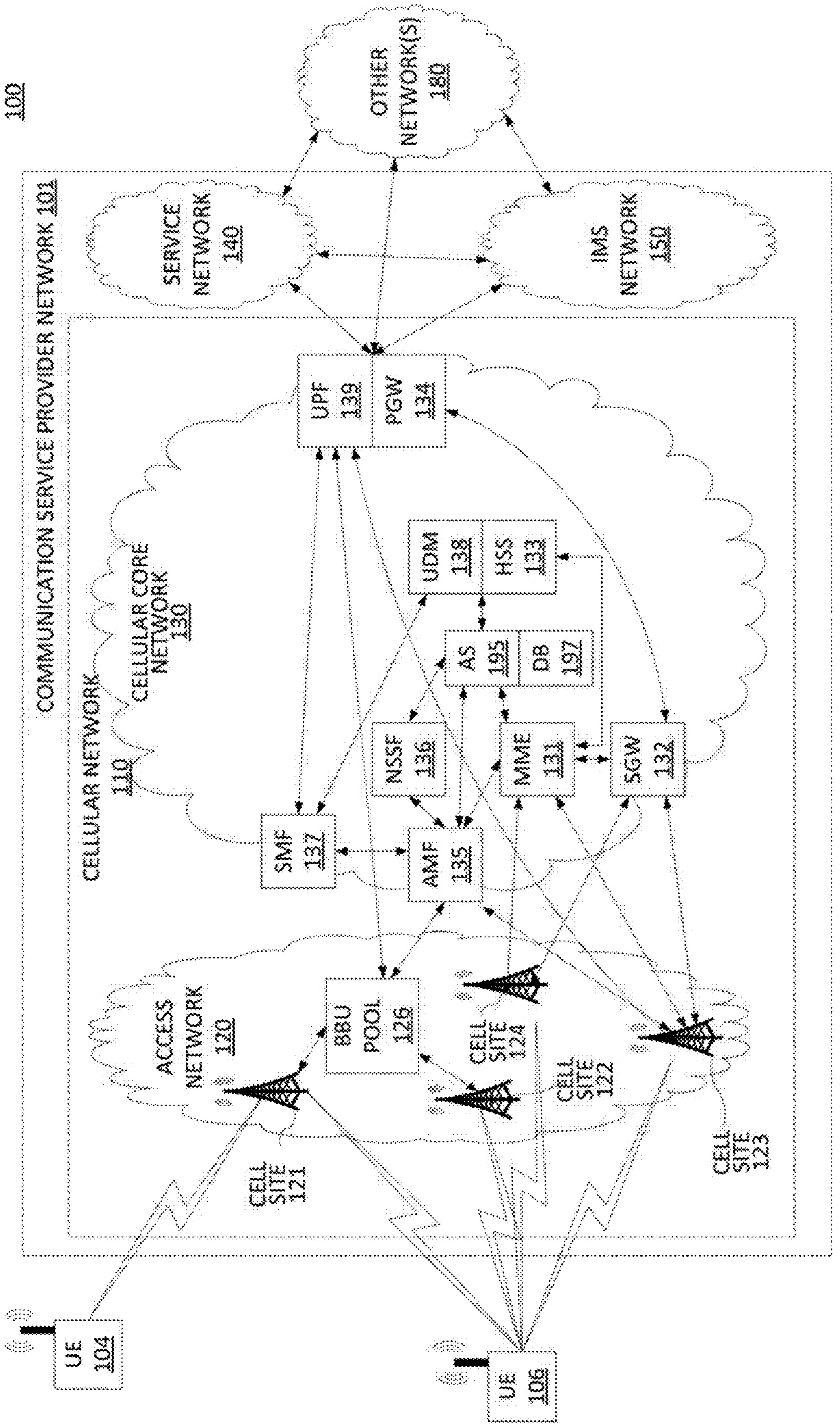
FIG. 1 illustrates an example network, or system, in which examples of the present disclosure may operate.

In one example, the present disclosure describes a method for automatically activating a dedicated network slice for emergencies in response to detecting an action on a mobile device that indicates an emergency situation. As discussed above, a "network slice" is a set of network resources that collectively provides an end-to-end network that is tailored to fulfill specific performance requirements. For instance, a plurality of network slices may be configured, where each network slice may provide different performance with respect to one or more key performance indicators (or "KPIs," e.g., throughput, latency, packet loss, etc.). Network slices may also be configured to address the needs of specific applications or types of applications (e.g., providing high upload speeds for streaming high bitrate video, providing encryption for the transmission of sensitive data such as data streams generated by health monitoring sensors, etc.).

In 5th generation (5G) mobile networks, a "network slice" is understood to refer even more specifically to a protected channel for one or more devices to privately communicate with a radio access network (RAN). Thus, although "network slice" or simply "slice" is a term of art within the protocol definitions of 5G mobile networks, "network slice" as understood within the context of the present disclosure encompasses both the 5G usage and broader network configurations across protocols and usage.

Some network slices may be dedicated for emergency services. For instance, a dedicated emergency services slice may route communications related to emergency services over the highest priority route(s) available. However, while these dedicated emergency services slices may be easily accessed by first responders, it may be more difficult for a layperson in need of emergency services to access these slices.

Examples of the present disclosure configure a mobile device to automatically initiate a handshake (e.g., similar to the handshake used to establish a transport control protocol connection) with an application server or device that is part of a dedicated emergency network slice when an action is detected on the mobile device that indicates an emergency situation. For instance, the action may be the mobile device dialing an emergency services phone number (e.g., 911 or 112, the local police or firefighters, or the like), the launching of an emergency services software application on the mobile device, or a spoken command from a user of the mobile device. In one embodiment, the dedicated network slice of the present disclosure to provide emergency services to users who are not first responders is distinct from another dedicated network slice which is specifically dedicated to be used by first responders only, i.e., another dedicated network slice that only allows first responders to communicate among themselves or other first responder entities, e.g., hospitals, disaster command centers, law enforcement centers, etc.

Once a connection between the mobile device and the application server has been established, the application server may send a command to the mobile device that causes the mobile device to automatically reconfigure its device settings, where the reconfigured device settings enable the mobile device to make fuller use of emergency services available via the dedicated emergency network slice. For instance, reconfiguration of the device settings may include: removing any settings that block incoming or outgoing communications to and from the mobile device, activating Bluetooth or other short-range wireless communication protocols on the mobile device, permitting sharing of the mobile device's location with emergency services or other devices, and/or other changes to the device settings.

On the network side, the application server may activate a series of network and first responder services to locate, track, and/or assist the user of the mobile device. In one example, activating the network services may involve identifying and allocating an optimal frequency band to the mobile device, where the optimal frequency band allows for reliable determination and tracking of the mobile device's location. Further examples of the present disclosure may integrate maps (e.g., city maps, building maps, and/or the like) and augmented reality equipment and applications with the dedicated emergency network slice to enable more accurate location and tracking services. In further examples, the application server may guide the user of the mobile device, as well as users of devices associated with emergency services, to specific locations at which safety and/or emergency services can be provided, or at which the network can provide optimal conditions for the download of applications, software, instructions, or the like to facilitate location and tracking of the mobile device. These and other aspects of the present disclosure are described in greater detail below in connection with the examples of FIGS. 1-4.

FIG. 1 illustrates an example network, or system, 100 in which examples of the present disclosure may operate. In one example, the system 100 includes a communication service provider network 101. The communication service provider network 101 may comprise a cellular network 110 (e.g., a 5G network, a 4G/Long Term Evolution (LTE)/5G hybrid network, or the like), a service network 140, and an IP Multimedia Subsystem (IMS) network 150. The system 100 may further include other networks 180 connected to the communication service provider network 101.

In one example, the cellular network 110 comprises an access network 120 and a cellular core network 130. In one example, the access network 120 comprises a radio access network (RAN), such as a cloud RAN, a distributed RAN (D-RAN), a centralized RAN (C-RAN), a virtualized RAN (V-RAN), or an open RAN (O-RAN). For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs) or radio units (RUs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as MIMO antennas, and millimeter wave antennas.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126. In one example, baseband unit functionality may be split into a centralized unit (CU) and a distributed unit (DU). In addition, the CU and the DU may be physically separate from one another. For instance, a DU may be situated with an RU/RRH at a cell site, while a CU may be in a centralized location hosting multiple CUs. Alternatively, or in addition, a single CU may serve multiple DUs and/or RUs/RRHs. In accordance with the present disclosure a "base station" may therefore comprise at least a BBU (e.g., in one example, a CU and/or a DU), and may further include at least one RRH/RU.

In another example, the access network 120 may comprise an O-RAN, and examples of the present disclosure for estimating network performance based on application synchronization signals may be deployed as an xApp in a RAN intelligent controller (RIC) of the O-RAN (i.e., a software tool used by the RIC to manage network functions in near-real time), close to a new radio (NR) component of the O-RAN.

Figure 4:
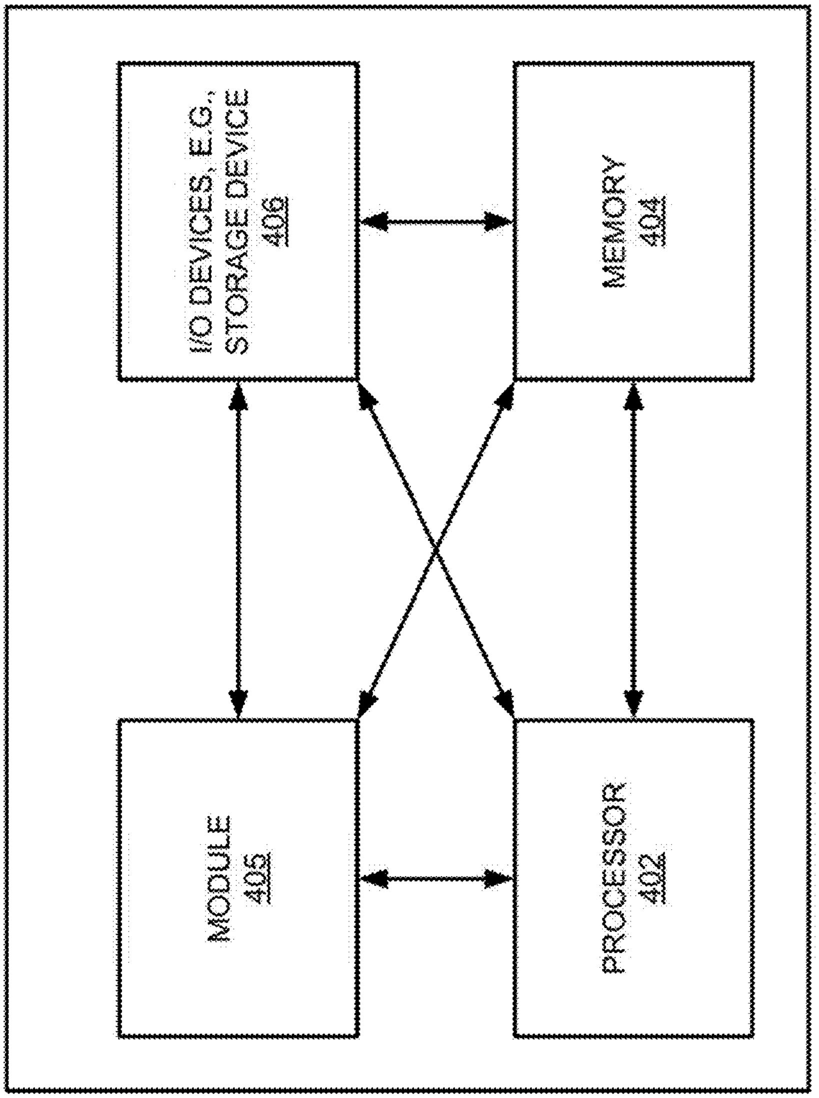
FIG. 4 depicts a high-level block diagram of a computing device specifically programmed to perform the functions described herein.

Any one or more of cell sites 121-123 may be deployed with antenna and radio infrastructures, including MIMO and millimeter wave antennas. Furthermore, a base station (e.g., cell sites 121-123 and/or baseband units within BBU pool 126) may comprise all or a portion of a computing system, such as computing system 400 as depicted in FIG. 4, and may be configured to provide information in connection with activating a dedicated network slice for emergencies and subsequently tracking a mobile device.

In one example, access network 120 may include both 4G/LTE and 5G/NR radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network nodes such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 5G network components, 3G network components, etc. Thus, cellular core network 130 may comprise an integrated network, e.g., including any two or more of 2G-5G infrastructures and technologies (or any future infrastructures and technologies to be deployed, e.g., 6G), and the like. For example, as illustrated in FIG. 1, cellular core network 130 further comprises 5G components, including: an access and mobility management function (AMF) 135, a network slice selection function (NSSF) 136, a session management function (SMF) 137, a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, a fifth network slice may be utilized for emergency services, and so forth.

In one example, SMF 137 may perform endpoint device IP address management, UPF selection, UPF configuration for endpoint device traffic routing to an external packet data network (PDN), charging data collection, quality of service (QoS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., a "5GC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure may also relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and/or users. For example, communication service provider network 101 may provide a cloud storage service, web server hosting, and other services. As such, service network 140 may represent aspects of communication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1. It should be noted that intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. Each of the UEs 104 and 106 may comprise a cellular telephone, a smartphone, a tablet computing device, a laptop computer, a pair of computing glasses, a wireless enabled wristwatch, a wireless transceiver for a fixed wireless broadband (FWB) deployment, an item of customer premises equipment, or any other cellular-capable mobile telephony and computing device (broadly, "an endpoint device"). The UEs 104 and 106 may be operated by subscribers of the cellular core network 130, subscribers of other cellular core networks, first responders, and/or other users.

In one example, each of the UEs 104 and 106 may comprise all or a portion of a computing system, such as computing system 400 depicted in FIG. 4, and may be configured to perform steps, functions, and/or operations in connection with examples of the present disclosure for activating a dedicated network slice for emergencies. In this regard, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

As illustrated in FIG. 1, UE 104 may access wireless services via the cell site 121 (e.g., NR alone, where cell site 121 comprises a gNB), while UE 106 may access wireless services via any of the cell sites 121-124 located in the access network 120 (e.g., for NR non-dual connectivity, for LTE non-dual connectivity, for NR-NR DC, for LTE-LTE DC, for EN-DC, and/or for NE-DC). For instance, in one example, UE 106 may establish and maintain connections to the cellular core network 130 via one or multiple gNBs (e.g., cell sites 121 and 122 and/or cell sites 121 and 122 in conjunction with BBU pool 126 and/or various other components, such as a CU and/or a DU). In another example, UE 106 may establish and maintain connections to the cellular core network 130 via a gNB (e.g., cell site 122 and/or cell site 122 in conjunction with BBU pool 126) and an eNodeB (e.g., cell site 124), respectively. In addition, either the gNB or the eNodeB may comprise a PCell, and the other may comprise a SCell for carrier aggregation and/or dual connectivity. Similarly, UE 106 may communicate with any of the cell sites 121 and 122 using carrier aggregation (CA) (e.g., in accordance with a CA technique). Furthermore, either or both of NR/5G and or EPC (4G/LTE) core network components may manage the communications between UE 106 and the cellular network 110 via cell site 122 and cell site 124.

In one example, the cellular core network 130 may further include an application server (AS) 195, which may comprise a computing system or server, such as computing system 400 depicted in FIG. 4, and may be configured to provide one or more operations or functions in connection with examples of the present disclosure for activating a dedicated network slice for emergencies. The cellular core network 130 may also include a database (DB) 197 that is communicatively coupled to the AS 195.

The AS 195 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the AS 195 may be configured to activate a dedicated network slice for emergencies in response to detecting an action on a mobile device that indicates an emergency situation. For instance, in some examples, the AS 195 may receive a message from a UE 104 or 106 initiating a virtual handshake, where a successful completion of the virtual handshake connects the UE 104 or 106 to a network slice that is dedicated for use by emergency services. The network slice may provide a combination of device settings, network resources, and services designed to quickly and reliably provide appropriate assistance to a mobile device user who is experiencing an emergency. While the UE 104 or 106 is connected to the network slice, the AS 195 may collect data from the UE 104 or 106 and/or from other data sources (potentially including other sensors in a vicinity of the UE 104 or 106) to provide to first responders. The collected data (e.g., biometric data of the users such as heart rate, body temperature, blood oxygen saturation, etc., location data, imagery data, etc.) may help the first responders to plan an optimal response for assisting the mobile device user. The AS 195 may also relay instructions from first responders to the UE 104 or 106 designed to keep the user safe until the user can be reached by the first responders or until the user can reach a safe location.

The DB 197 may store information about previous emergency situations that were revolved via the network slice, including optimal device settings of UE 104 or 106, optimal frequency band allocations, types of first responders to be alerted, types of instructions provided to the UE 104 or 106, types of data collected from the UE 104 or 106, and other data. This data may help the AS 195 to respond more optimally to similar emergencies in the future. In one example, the DB 197 may comprise a physical storage device integrated with the AS 195 (e.g., a database server or a file server), or attached or coupled to the AS 195, in accordance with the present disclosure. In one example, the AS 195 may load instructions into a memory, or one or more distributed memory units, and execute the instructions for automatically activating a dedicated network slice for emergencies, as described herein. Example methods for automatically activating a dedicated network slice for emergencies in response to detecting an action on a mobile device that indicates an emergency situation are described in greater detail below in connection with FIG. 2 and FIG. 3.

In one example, the cellular core network 130 may include multiple instances of the AS 195 and DB 197 distributed throughout the cellular core network 130, where the multiple instances each store identical data for the purposes of redundancy.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In one example, any one or more of the cell sites 121-123 may comprise 2G, 3G, 4G and/or LTE radios, e.g., in addition to 5G new radio (NR), or gNB functionality, or any future cellular technology, e.g., 6G and so on. For instance, cell site 123 is illustrated as being in communication with AMF 135 in addition to MME 131 and SGW 132. Thus, these and other modifications are all contemplated within the scope of the present disclosure.

Figure 2:
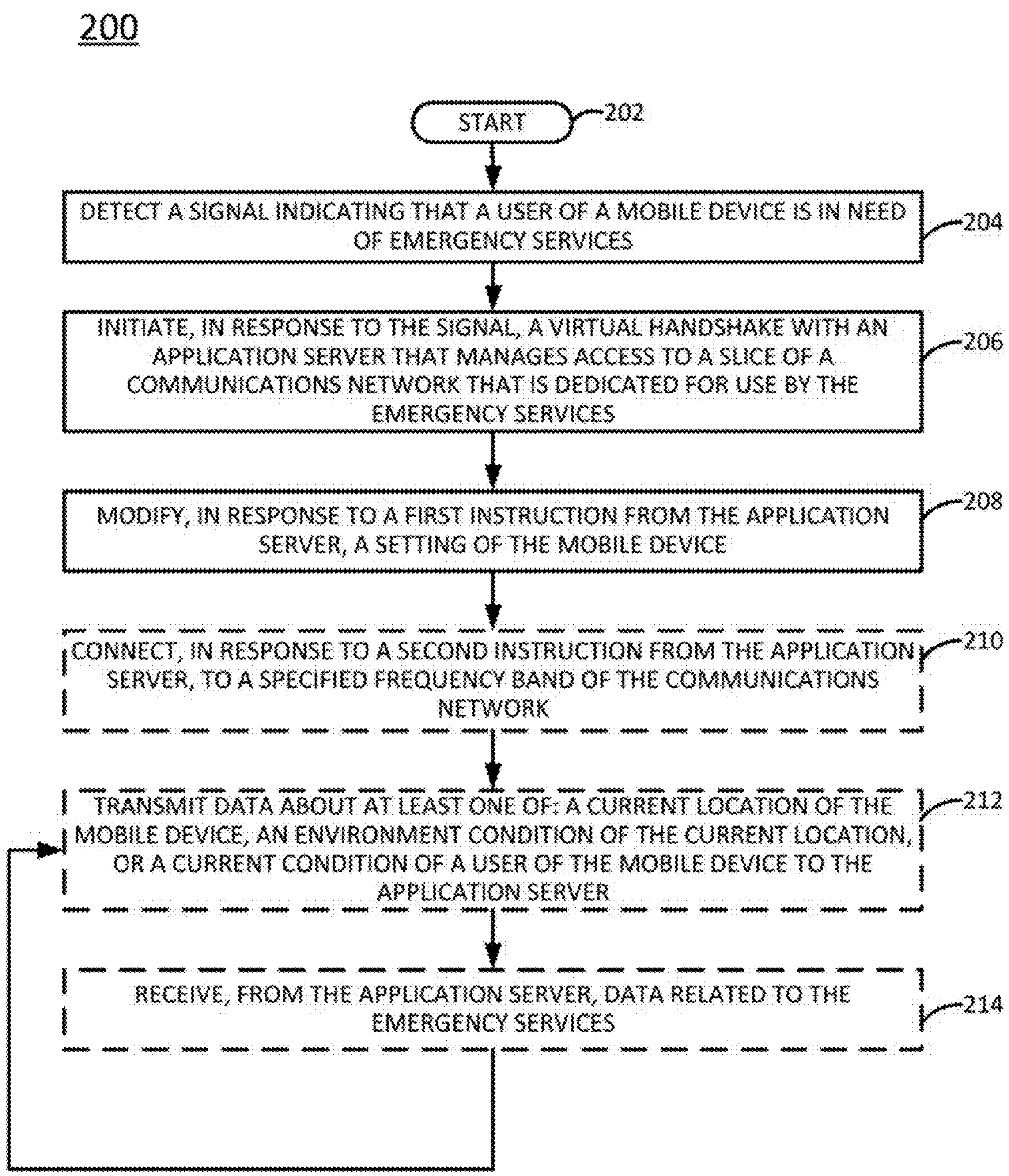
FIG. 2 illustrates a flowchart of an example method for automatically activating a dedicated network slice for emergencies, in accordance with the present disclosure.

To further aid in understanding the present disclosure, FIG. 2 illustrates a flowchart of an example method 200 for automatically activating a dedicated network slice for emergencies, in accordance with the present disclosure. In particular, the method 200 provides a method by which a mobile device belonging to a user who is in need of emergency services may connect to a dedicated network slice that provides device, network, and service support for responding to the emergency. In one example, the method 200 may be performed by a user endpoint device, such as one or more of the UEs 104 or 106 illustrated in FIG. 1. However, in other examples, the method 200 may be performed by another device, such as the processor 402 of the system 400 illustrated in FIG. 4. For the sake of example, the method 200 is described as being performed by a processing system.

The method 200 begins in step 202. In step 204, the processing system may detect a signal indicating that a user of a mobile device is in need of emergency services, where the user is not a first responder, e.g., the user is not a law enforcement officer, a firefighter, or a medical personnel.

In one example, the mobile device may be any device that is capable of connecting to and transmitting communications via a wireless communications network. For instance, the mobile device may be a cellular smart phone, a wearable computing device (e.g., smart glasses, a VR headset or other types of head mounted display, or the like), a laptop computer, a tablet computer, or the like. In one example, the processing system is part of the mobile device.

The signal indicating that the user is in need of emergency services may comprise any one or more of a number of signals detectable by the processing system. For instance, in one example, the signal may comprise the user placing a call to emergency services (e.g., 911 or 112, the local police or firefighters, or the like) using the mobile device. In another example, the signal may comprise the user uttering a word or phrase that indicates that the user requires emergency services (e.g., "I'm lost," "I'm hurt," "Call the police," or the like). In this case, the word or phrase may comprise a predefined keyword or phrase that is mapped by a rule to a specific action (e.g., if the keyword is spoke, then call the police). Alternatively, the processing system may utilize natural language processing techniques to parse an intent from the word or phrase and infer a responsive action (e.g., the user has said they are hurt, so paramedics should be called). In another example, the signal may comprise the user taking an action with respect to the mobile device, such as pressing a physical or graphical user interface button on the mobile device that is associated with emergency services, or launching an application that is associated with requesting emergency services. In another example, the mobile device may comprise a connected vehicle, and the connected vehicle may be equipped with a service or system that contacts emergency services when certain events are detected by one or more systems of the connected vehicle (e.g., an airbag deploying, running out of gas, tires losing air pressure at greater than a threshold rate, and the like).

In step 206, the processing system may initiate, in response to the signal, a virtual handshake with an application server that manages access to a slice of a communications network that is dedicated for use by the emergency services.

In one example, the network slice may include a set of network resources that collectively provides an end-to-end network that is tailored to fulfill specific performance requirements for the emergency services, e.g., to users who are not first responders. For instance, the network slice may be configured to provide high upload and download speeds, low packet loss, encryption for the transmission of sensitive data (e.g., the identity, location, and/or medical condition of the user of the mobile device, etc.), and/or other services specifically designed to facilitate the expedient deployment of emergency services to users who are not first responders.

In one example, the virtual handshake may comprise an exchange of a series of messages between the processing system and the application server, where the result of a successful exchange of the series of messages is the establishment of a secure communications channel or session between the processing system and the application server. A mobile device may include a built-in feature (e.g., built-in by the manufacturer of the mobile device) that causes the mobile device to initiate the virtual handshake in response to detecting the signal of step 204. The secure session may persist until one of the processing system or the application server sends a message to terminate or close the session.

In step 208, the processing system may modify, in response to a first instruction from the application server, a setting of the mobile device.

In one example, once the processing system has established a session with the application server via the dedicated network slice, the application server may instruct the processing system to modify one or more settings of the mobile device to improve the mobile device's ability to receive useful data and/or to improve the ability of the providers of the emergency services to locate and track the mobile device.

For instance, in one example, modifying the setting of the mobile device may include removing or reversing any settings that may prevent or block other devices from communicating with the mobile device (e.g., do not disturb mode, notification silencing, settings that send unrecognized callers to voice mail, etc.). In another example, modifying the setting of the mobile device may include enabling location sharing (e.g., allowing software applications and services to see the mobile device's real time global positioning system coordinates and movements), enabling short-range wireless communications (e.g., Bluetooth or the like), and/or other modifications. In another example, modifying the setting of the mobile device may include allowing all pushes, messages, or other communications originating from a provider of emergency services. For instance, many common mobile device settings that may be selected for the purposes of protecting user privacy may unintentionally hamper emergency services' ability to locate, track, and/or communicate with the user of the mobile device.

In optional step 210 (illustrated on phantom), the processing system may connect, in response to a second instruction from the application server, to a specified frequency band of the communications network.

In one example, the specified frequency band may be a radio frequency band that is allocated to the mobile device by the application server based on a determination by the application server that the specified frequency band is an optimal frequency band for the needs of the user of the mobile device. For instance, the application server may allocate a relatively lower frequency band to the mobile device to facilitate location and/or tracking of the mobile device within a relatively large coverage area of the communications network. Alternatively, the application server may allocate a relatively higher frequency band (e.g., a cellular, WiFi, or Bluetooth frequency band) to the mobile device to facilitate location and/or tracking of the mobile device at a more granular level.

In optional step 212 (illustrated in phantom), the processing system may transmit data about at least one of: a current location of the mobile device, an environmental condition of the current location, or a physical condition of a user of the mobile device to the application server.

In one example, one or more sensors integrated into the mobile device and communicatively coupled to the processing system may collect data which the application server may in turn send to the provider of the emergency services or store in a database accessible by the provider of the emergency services. For instance, the one or more devices or sensors may include a camera, a biometric sensor (e.g., a sensor to measure user heart rate, blood pressure, blood oxygenation, blood glucose level, blood alcohol content, body temperature, skin conductivity, or the like), ambient temperature and humidity sensors, gyroscopes, global positioning system sensors, or the like. The collected data may allow the provider of the emergency services to determine not just the location of the mobile device, but also the physical condition of the user of the mobile device (e.g., vital signs and other biometrics, evidence of consciousness, concussion, blood loss, broken bones, or the like), environmental conditions at the current location of the mobile device (e.g., natural disasters, temperature, precipitation, etc.), and/or the nature of the emergency services that may be needed (e.g., fire, paramedics, medivac, etc.).

In one example, the data may be sent to the application server via the slice of the communications network that is dedicated to the emergency services to users who are not first responders, ensuring quick reliable delivery to the application server. However, step 212 may be considered optional because in some examples, the same information could be provided to the application server by one or more sensors that are external to the mobile device (e.g., sensors that are distributed throughout the current physical location of the mobile device, such as security cameras, Internet of Things devices, connected vehicles, and/or the like).

In optional step 214 (illustrated in phantom), the processing system may receive, from the application server, data related to the emergency services.

For instance, in one example, the application server may continuously provide data to the processing system to assist the user of the mobile device. As an example, if the user originally signaled that they were in need of emergency services, then the data may comprise navigation directions (e.g., text, audio, or graphic directions, or even instructions to control the operation of a connected vehicle) to guide the user to a safe or known location so that the user is either no longer lost, or can wait for further assistance from first responders without risk of injury. As another example, if the user has suffered an injury, the instructions may comprise directions (e.g., text, audio, or graphic directions) designed to keep the user conscious (e.g., questions to keep the user talking) or to otherwise prevent further injury until first responders can reach the user (e.g., minimize bleeding, elevate limb, don't move, etc.). In further examples, the data may simply inform the user that first responders are on their way or provide an estimated time of arrival for the first responders.

The processing system may continue to iterate through one or more of steps 212-214 throughout the secure session, so that the application server can continue to track the mobile device and/or provide appropriate or updated data as the physical location of the mobile device, the environmental conditions in the physical location of the mobile device, and/or the physical condition of the user of the mobile device changes.

The processing system may continue to iterate through steps 212-214 as necessary until the secure session between the processing system and the application server is terminated by either of the processing system or the application server. For instance, the user of the mobile device may use the processing system to terminate the secure session if the user of the mobile device determines that the user no longer requires assistance from the emergency services (e.g., a user who was previously lost has been able to successfully navigate to a safe or known location). Similarly, the provider of the emergency services may send a signal to the application server to terminate the secure session if the provider determines that the emergency has been resolved (e.g., appropriate assistance has been provided to the user of the mobile device). In some examples, once the secure session has been terminated, the processing system may reconnect to its default (or pre-emergency) network slice and may restore any previous device settings that were modified.

Figure 3:
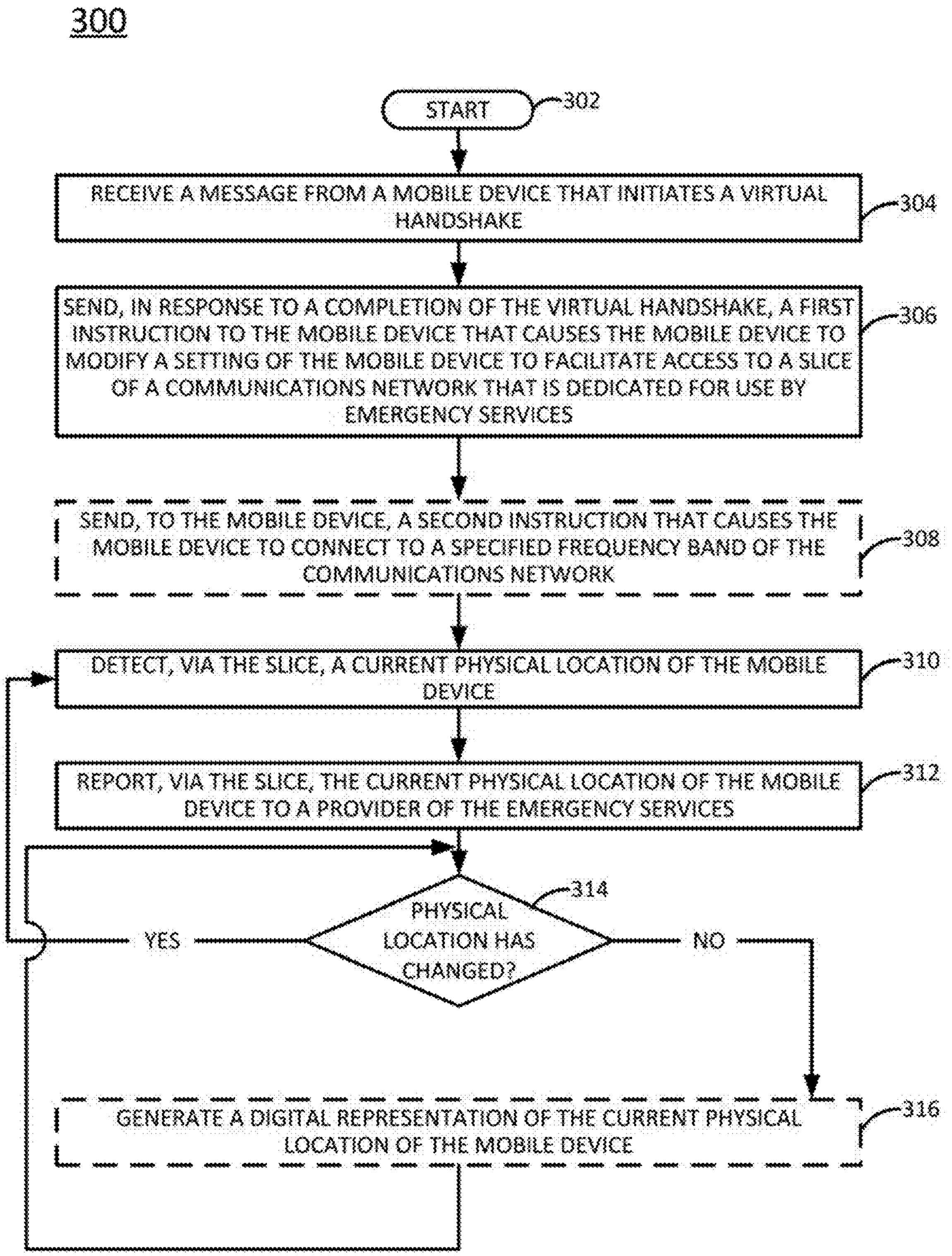
FIG. 3 illustrates a flowchart of an example method for automatically activating a dedicated network slice for emergencies, in accordance with the present disclosure.

FIG. 3 illustrates a flowchart of an example method 300 for automatically activating a dedicated network slice for emergencies, in accordance with the present disclosure. In particular, the method 300 provides a method by which an application server may connect a mobile device belonging to a user who is in need of emergency services may connect to emergency services via a dedicated network slice that provides device, network, and service support for responding to emergencies. In one example, the method 300 may be performed by an application server, such as the AS 195 illustrated in FIG. 1. However, in other examples, the method 300 may be performed by another device, such as the processor 402 of the system 400 illustrated in FIG. 4. For the sake of example, the method 300 is described as being performed by a processing system.

The method 300 begins in step 302. In step 304, the processing system may receive a message from a mobile device that initiates a virtual handshake.

In one example, processing system may be part of an application server that manages access to a slice of a communications network that is dedicated for use by emergency services. The network slice may include a set of network resources that collectively provides an end-to-end network that is tailored to fulfill specific performance requirements for the emergency services provided to users who are not first responders. For instance, the network slice may be configured to provide high upload and download speeds, low packet loss, encryption for the transmission of sensitive data (e.g., the identity, location, and/or medical condition of the user of the mobile device, etc.), and/or other services specifically designed to facilitate the expedient deployment of emergency services to users who are not first responders. In one example, the application server may comprise a computing device that is located at a fixed geographic location. In another example, the application server may be integrated in a vehicle (e.g., whose physical location may change over time).

In one example, the virtual handshake may comprise an exchange of a series of messages between the processing system and the mobile device, where the result of a successful exchange of the series of messages is the establishment of a secure communications channel or session between the processing system and the mobile device. The session may persist until one of the processing system or the mobile device sends a message to terminate or close the session.

In step 306, the processing system may send, in response to a completion of the virtual handshake, a first instruction that causes the mobile device to modify a setting of the mobile device to facilitate access to a slice of a communications network that is dedicated for use to provide emergency services to users who are not first responders.

In one example, once the processing system has established a session with the mobile device via the dedicated network slice, the processing system may instruct the mobile device to modify one or more settings of the mobile device to improve the mobile device's ability to receive useful data and/or to improve the ability of the providers of the emergency services to locate and track the mobile device.

For instance, in one example, the first instruction may cause the mobile device to perform at least one of the following modifications to the mobile device settings: removing or reversing any settings that may prevent or block other devices from communicating with the mobile device (e.g., do not disturb mode, notification silencing, settings that send unrecognized callers to voice mail, etc.); enabling location sharing (e.g., allowing software applications and services to see the mobile device's real time global positioning system coordinates and movements), enabling short-range wireless communications (e.g., Bluetooth or the like), allowing all pushes, messages, or other updates originating from a provider of emergency services, and/or other modifications. For instance, many common mobile device settings that may be selected for the purposes of protecting user privacy may unintentionally hamper emergency services' ability to locate, track, and/or communicate with the user of the mobile device.

In optional step 308 (illustrated in phantom), the processing system may send, to the mobile device, a second instruction that causes the mobile device to connect to a specified frequency band of the communications network.

In one example, the specified frequency band may be a radio frequency band that is allocated to the mobile device by the processing system based on a determination by the processing system that the specified frequency band is an optimal frequency band for the needs of the user of the mobile device. For instance, the processing system may allocate a relatively lower frequency band to the mobile device to facilitate location and/or tracking of the mobile device within a relatively large coverage area of the communications network. Alternatively, the processing system may allocate a relatively higher frequency band (e.g., a cellular, WiFi, or Bluetooth frequency band) to the mobile device to facilitate location and/or tracking of the mobile device at a more granular level.

In step 310, the processing system may detect, via the slice, a current physical location of the mobile device.

As discussed above, detection of the mobile device's current physical location may be facilitated by removal of mobile device settings that block location access and/or allocation of the mobile device to a radio frequency band of the communications network that facilitates location identification at an appropriate level of granularity. Thus, the processing system is able to detect an electronic "footprint" of the mobile device.

In step 312, the processing system may report, via the slice, the current physical location of the mobile device to a provider of the emergency services.

In one example, the current physical location may be reported to the provider of the emergency services in a variety of ways. For instance, in one example, the current physical location may be reported via a text-based message (e.g., the mobile device is located at the corner of First St. and First Ave. in New York City) sent to a device (e.g., smart phone, tablet, smart watch, or the like) of the provider. In another example, the current physical location of the mobile device may be reported via a graphics-based message or signal to a device of the provider. For instance, the current physical location may be presented as a pinpoint on a map that is viewable on a smart phone or tablet of the provider. Alternatively, the current physical location may be reported as a set of navigation instructions on the provider's smart phone, tablet, or augmented reality device (e.g., augmented reality headset).

In step 314, the processing system may determine whether the current physical location of the mobile device has changed.

In one example, once the current physical location of the mobile device has been detected for the first time, the processing system may continuously track the current physical location of the mobile device for as long as the secure session is active. For instance, the processing system may track the current physical location of the mobile device by storing a record of service set identifiers (SSIDs), wireless hotspots, local area networks (LANs), or the like with which the mobile device has interacted during the secure session. In one case, the SSID associated with each physical location that the mobile device passes may be uploaded to the processing system and made accessible for review by the provider of the emergency services. In another example, the modification to the setting caused by the first instruction may cause the mobile device to send periodic "ping" messages that can be tracked. In another example, other devices that the mobile device passes by (e.g., within a distance close enough to communication via a short range wireless communication such as Bluetooth or radio frequency identification) may send messages to the processing system to indicate the mobile device's physical location.

In another example, once the current physical location of the mobile device has been detected for the first time, the processing system may send messages to one or more devices or sensors within a specified geographic radius of the current physical location of the mobile device where the messages request that the one or more devices or sensors collect information about the mobile device and send the collected information to the processing system, to the provider of the emergency services, or to a database accessible by the provider of the emergency services. For instance, the one or more devices or sensors may include a camera (e.g., a security camera), an Internet of Things (IoT) device, a connected vehicle, sensors built into the mobile device (e.g., cameras, biometric sensors, temperature and humidity sensors, gyroscopes, etc.), or the like. The collected information may allow the provider of the emergency services to determine not just the location of the mobile device, but also the physical condition of the user of the mobile device (e.g., vital signs and other biometrics, evidence of consciousness, concussion, blood loss, broken bones, or the like), environmental conditions at the current location of the mobile device (e.g., natural disasters, temperature, precipitation, etc.), and/or the nature of the emergency services that may be needed (e.g., fire, paramedics, medivac, etc.).

In another example, the mobile device may be one of a group of (e.g., two or more) devices whose locations are tracked together. For instance, if two individuals are together when a mobile device belonging to one of the individuals initiates the handshake of step 302, the processing system may determine that the other individual's device is also detectable and may track both devices together. If the individuals should separate such that the processing system detects that the two devices are no longer in the same physical location, the processing system may begin tracking both devices separately.

In one example, a change in the physical location of the mobile device may be considered notable for the purposes of step 314 if the physical location has changed by more than a threshold distance. For instance, in some cases (e.g., where the user of the mobile device is lost and may be trying to retrace the user's route or navigate to a safe location), the mobile device may be in constant or semi-constant motion. However, in other examples, the physical location of the mobile device may be observed to change slightly due to changing conditions in the wireless signal, GPS connection with satellites, or other circumstances, even though the user of the mobile device may be largely stationary or unable to move himself or herself a significant distance (e.g., where the user may have suffered an injury that limits his or her mobility, or where the user's vehicle may be rendered inoperable). Thus, tuning of the threshold distance may help the processing system to determine when the current physical location of the mobile device has changed due to the user being in motion (which is information that a provider of emergency services may need to know) or due to simple network condition fluctuations (which the provider of the emergency services may not need to know).

If the processing system concludes in step 314 that the physical location of the mobile device has changed, then the method 300 may return to step 310 and proceed as described above to determine the new current physical location of the mobile device and report the new current physical location of the mobile device to the provider of the emergency services. If, however, the processing system concludes in step 314 that the physical location of the mobile device has not changed, then the method 300 may proceed to step 316.

In optional step 316 (illustrated on phantom), the processing system may generate a digital representation of the current physical location of the mobile device.

For instance, the processing system may use augmented reality techniques to generate a digital twin or other digital representations of the current physical location of the mobile device. The digital representation may be based on information collected by one or more devices or sensors in the current location of the mobile device and/or on public and corporate information (e.g., maps, blueprints, or the like) for the current physical location of the mobile device. The digital representation may provide the provider of the emergency services with a better understanding of the current location of the mobile device (e.g., layout, entrances and/or exits, obstacles, heavy machinery or equipment, potential safety hazards, and the like), which may help the provider of the emergency services to determine the fastest and safest way to reach the user of the mobile device. In one example, the digital representation may use virtual arrows or other graphical indicators to identify the specific location of the user of the mobile device within the current physical location of the mobile device (e.g., specific room or floor within a building, specific section/row/seat within a stadium or theater, etc.).

After the processing system has generated the digital representation, the method 300 may return to step 314, and the processing system may continue as described above depending upon whether the current physical location of the mobile device has changed. For instance, if the current physical location of the mobile device has changed, the processing system may report the new current physical location of the mobile device (per step 312) and/or re-generate the digital representation (per step 316) to reflect the change.

The processing system may continue to iterate through steps 310-316 as necessary until the secure session between the processing system and the mobile device is terminated by either of the processing system or the mobile device. For instance, the user of the mobile device may use the mobile device to terminate the secure session if the user of the mobile device determines that the user no longer requires assistance from the emergency services (e.g., a user who was previously lost has been able to successfully navigate to a safe or known location). Similarly, the provider of the emergency services may send a signal to the processing system to terminate the secure session if the provider determines that the emergency has been resolved (e.g., appropriate assistance has been provided to the user of the mobile device).

In some examples, once the secure session has been terminated, the mobile device may reconnect to its default (or pre-emergency) network slice. In further examples, information about the secure session (e.g., the identity of the user of the mobile device, the location of the emergency, the nature of the emergency, the nature of the response to the emergency, the identities of the first responders who responded to the emergency, etc.) can be saved for later analysis. Analysis of the saved data, as well as saved data pertaining to other secure sessions, can provide insights into how to better respond to different types and/or locations of emergencies in the future (e.g., optimal allocation of frequency bands in specific physical locations, best types of first responders to alert, physical locations for which more detailed data such as maps or blueprints may be useful, etc.).

Thus, examples of the present disclosure may be useful in a variety of emergency situations in which first responders require quick and reliable location data of and/or communication with an individual who is in need of assistance. For instance, examples of the present disclosure may be used to provide medical services to an individual who has experienced a fall and cannot physically get themselves to a location where the individual can receive help. In other examples, the present disclosure may be used to provide directions to an individual who has gotten lost (e.g., by providing navigation directions, virtual routes or arrows, or the like, to guide the individual to a safe or known location or to retrace the individual's steps). In other examples, the present disclosure may be used to verify that an individual is following the correct route (e.g., by tracking traversal of service set identifier checkpoints) in either a real world geographic location or a metaverse location. This example may also be useful to either guide an individual or guide first responders to an individual in a large indoor location (e.g., a convention center, a stadium, a museum, a tourist spot, or the like) where a GPS signal may be unavailable. In other examples, the present disclosure may be used to locate and track a criminal suspect or fugitive (e.g., by tracing cell sites traversed by the criminal suspect or fugitive). In this example, the criminal suspect's or fugitive's mobile device may be instructed to modify its settings to enable location tracking without the mobile device initiating a virtual handshake (e.g., the virtual handshake may be initiated by an application server or other devices in the communications network in a manner that is undetectable by the criminal suspect or fugitive). In other examples, the present disclosure may be used to guide a connected vehicle that has been involved in or is currently near a site of an accident to a safe location.

Moreover, although examples of the disclosure as discussed above may make reference to a single network slice that is dedicated for use to provide emergency services to users who are not first responders, in further examples, multiple network slices may be defined and dedicated for use to provide emergency services to users who are not first responders. For instance, in a commercial context, each business in a shopping center or mall could be configured on a network sub-slice so that each business contributes to a dedicated network slice while autonomously managing its own sub-slice. A similar approach could be used for each room, floor, wing, or the like of a hospital, a school, a factory, a stadium, a theater, a museum, or the like.

Although not expressly specified above, one or more steps of the methods 200 or 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or method 300 may be implemented as the system 400. For instance, a user endpoint device (such as might be used to perform the method 200) or an application server (such as might be used to perform the method 300) could be implemented as illustrated in FIG. 4.

As depicted in FIG. 4, the system 400 comprises a hardware processor element 402, a memory 404, a module 405 for automatically activating a dedicated network slice for emergencies, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for automatically activating a dedicated network slice for emergencies may include circuitry and/or logic for performing special purpose functions relating to the allocation of resources and exchange of data for facilitating responses to emergencies. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for automatically activating a dedicated network slice for emergencies (e.g., a software program comprising computer-executable instructions) can be loaded into memory 404 and executed by hardware processor element 402 to implement the steps, functions or operations as discussed above in connection with the example method 200 or example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for automatically activating a dedicated network slice for emergencies (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:

receiving, by a processing system including at least one processor, a message from a mobile device of a user that initiates a virtual handshake, wherein the user is not a first responder;

sending, by the processing system in response to a completion of the virtual handshake, a first instruction that causes the mobile device to modify a setting of the mobile device to facilitate access to a slice of a communications network that is dedicated for use by emergency services;

detecting, by the processing system via the slice, a current physical location of the mobile device; and reporting, by the processing system via the slice, the current physical location of the mobile device to a provider of an emergency service.

2. The method of claim 1, wherein the processing system is part of an application server that manages access to the slice.

3. The method of claim 1, wherein the first instruction causes the mobile device to perform at least one of: removing a setting that prevents other devices from communicating with the mobile device, enabling location sharing, enabling short-range wireless communications, or allowing all pushes, messages, and updates originating from the provider of the emergency service.

4. The method of claim 1, wherein the detecting is performed continuously to track changes in the current physical location of the mobile device.

5. The method of claim 1, wherein the reporting is performed via at least one of: a text-based message, a graphics-based message, a set of navigation instructions, or instructions to control operation of a connected vehicle.

6. The method of claim 1, further comprising:

sending, by the processing system to the mobile device, a second instruction that causes the mobile device to connect to a specified frequency band of the communications network.

7. The method of claim 6, wherein the specified frequency band is selected based on a size of an area within which the current physical location of the mobile device is to be detected.

8. The method of claim 1, wherein the detecting is based on a tracking of at least one of: a service set identifier, a wireless hotspot, a local area network, or another mobile device with which the mobile device has interacted subsequent to the completion of the virtual handshake.

9. The method of claim 1, further comprising collecting data from a sensor within a specified geographic radius of the current physical location of the mobile device.

10. The method of claim 9, wherein the sensor comprises at least one of: a camera, an internet of things device, a connected vehicle, or a sensor built into the mobile device.

11. The method of claim 9, wherein the data that is collected provides information about at least one of: the current physical location of the mobile device, a physical condition of the user of the mobile device, an environmental condition at the current physical location of the mobile device, or one or more emergency services that are needed.

12. The method of claim 1, further comprising:

generating, by the processing system, a digital representation of the current physical location of the mobile device.

13. The method of claim 12, wherein the digital representation comprises a digital twin.

14. The method of claim 12, wherein the digital representation is generated based at least in part on information contained in at least one of: a map of the current physical location of the mobile device or a blueprint of the current physical location of the mobile device.

15. The method of claim 12, wherein the digital representation includes directions for guiding the provider of the emergency service to the current physical location of the mobile device.

16. The method of claim 12, wherein the processing system provides data related to the emergency service to the mobile device.

17. The method of claim 16, wherein the data related to the emergency service comprises at least one of: navigation directions to guide the user of the mobile device to a known location, directions designed to keep the user of the mobile device conscious, or directions designed to prevent a further injury of the user of the mobile device until the provider of the emergency service can reach the user.

18. The method of claim 16, wherein the data related to the emergency service comprises an estimated time of arrival for the provider of the emergency service.

19. A non-transitory computer-readable medium storing instructions which, when executed by a processing system including at least one processor, cause the processing system to perform operations, the operations comprising:

receiving a message from a mobile device of a user that initiates a virtual handshake, wherein the user is not a first responder;

sending, in response to a completion of the virtual handshake, a first instruction that causes the mobile device to modify a setting of the mobile device to facilitate access to a slice of a communications network that is dedicated for use by emergency services;

detecting, via the slice, a current physical location of the mobile device; and reporting, via the slice, the current physical location of the mobile device to a provider of an emergency service.

20. A device comprising:

a processing system including at least one processor; and a computer-readable medium storing instructions which, when executed by the processing system, cause the processing system to perform operations, the operations comprising:

receiving a message from a mobile device of a user that initiates a virtual handshake, wherein the user is not a first responder;

sending, in response to a completion of the virtual handshake, a first instruction that causes the mobile device to modify a setting of the mobile device to facilitate access to a slice of a communications network that is dedicated for use by emergency services;

detecting, via the slice, a current physical location of the mobile device; and reporting, via the slice, the current physical location of the mobile device to a provider of an emergency service.

* * * * *